United States Patent
Komatsubara (10) Patent No.: US 11,317,601 B2
(45) Date of Patent: May 3, 2022

(54) PET BED

(71) Applicant: Unicharm Corporation, Ehime (JP)

(72) Inventor: Daisuke Komatsubara, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 717 days.

(21) Appl. No.: 16/300,680

(22) PCT Filed: May 20, 2016

(86) PCT No.: PCT/JP2016/065086
§ 371 (c)(1),
(2) Date: Nov. 12, 2018

(87) PCT Pub. No.: WO2017/195382
PCT Pub. Date: Nov. 16, 2017

(65) Prior Publication Data
US 2019/0174713 A1    Jun. 13, 2019

(30) Foreign Application Priority Data
May 13, 2016 (JP) .............................. JP2016-097178

(51) Int. Cl.
*A01K 1/035* (2006.01)
*A01K 1/015* (2006.01)

(52) U.S. Cl.
CPC .......... *A01K 1/0353* (2013.01); *A01K 1/0157* (2013.01)

(58) Field of Classification Search
CPC .... A01K 1/0353; A01K 1/035; A01K 1/0107; A01K 23/00; A01K 23/005; A01K 1/015; A01K 1/0157
See application file for complete search history.

(56) References Cited

U.S. PATENT DOCUMENTS 1,820,283 A * 8/1931 Mills .................... A01K 1/0353
5/114
2,032,248 A * 2/1936 Bins ..................... A01K 1/0353
119/482
(Continued)

FOREIGN PATENT DOCUMENTS

CN         1277010 A      12/2000
EP         622018      * 11/1994
(Continued)

OTHER PUBLICATIONS

English Abstract and Machine Translation for Chinese Publication No. CN1277010A, published Dec. 20, 2000, 11 pgs.
(Continued)

*Primary Examiner* — Thanh Pham
(74) *Attorney, Agent, or Firm* — Fredrikson & Byron, P.A.

(57) ABSTRACT

The purpose of the present invention is to provide a pet bed which, even when excretion or another liquid is excreted onto an excretion surface of the bed during use of the pet bed, can suppress stuffiness on the excretion surface of the pet bed, and bedsores (pressure sores) resulting therefrom. This pet bed (1, 41) is provided with: a mat (3) having a planar direction and a thickness direction and having a top surface and a bottom surface; and an absorbent sheet (5) which is arranged on the top surface of the mat so as to overlap the mat in the thickness direction. The mat (3) is a fibrous structure configured from thermoplastic resin fibers (15, 17), and the absorbent sheet (5) includes a liquid-permeable front surface sheet (21), an absorbent body (25), and a liquid-impermeable and moisture-permeable back sheet (23).

10 Claims, 5 Drawing Sheets

(56) References Cited

U.S. PATENT DOCUMENTS

| | | | |
|---|---|---|---|
| 3,683,916 A * | 8/1972 | Mesek | A61F 13/49406 604/365 |
| 3,691,570 A * | 9/1972 | Gaines | A61F 5/485 5/487 |
| 3,730,184 A * | 5/1973 | Mesek | A61F 13/51121 604/365 |
| 5,702,791 A * | 12/1997 | Zegeer | A47C 31/10 150/158 |
| 5,724,911 A | 3/1998 | McAlister | |
| 5,784,995 A | 7/1998 | Willinger | |
| 7,185,604 B2 | 3/2007 | Holte | |
| 8,267,043 B1 * | 9/2012 | Gustafson | A01K 13/00 119/28.5 |
| 8,783,211 B1 | 7/2014 | Weeden | |
| 2001/0045372 A1 * | 11/2001 | Curley | A01K 1/0353 206/525 |
| 2004/0137212 A1 * | 7/2004 | Ochoa | A01K 1/0157 428/319.3 |
| 2005/0278863 A1 * | 12/2005 | Bahash | A01K 1/0353 5/726 |
| 2006/0000415 A1 * | 1/2006 | Behnke | A61F 7/034 119/28.5 |
| 2013/0046263 A1 * | 2/2013 | Fukudome | B32B 5/30 604/372 |

FOREIGN PATENT DOCUMENTS

| | | | |
|---|---|---|---|
| EP | 3456186 A1 | 3/2019 | |
| JP | 2006000102 A | 1/2006 | |
| JP | 2006180793 A | 7/2006 | |
| JP | 2007118791 A | 6/2007 | |
| JP | 2007181725 A | 7/2007 | |
| JP | 2009118791 A | 6/2009 | |
| JP | 3191888 U | 7/2014 | |
| JP | 2014168400 A | 9/2014 | |
| WO | WO 8705784 | * | 10/1987 |
| WO | 03020163 A2 | 3/2003 | |
| WO | 2017195383 A1 | 11/2017 | |

OTHER PUBLICATIONS

English Abstract for Japanese Publication No. 2006-180793 A, published Jul. 13, 2006, 1 pg.
English Machine Translation for Japanese Publication No. 3191888 U, published Jul. 17, 2014, 14 pgs.
English Abstract for Japanese Publication No. 2006-000102 A, published Jan. 5, 2006, 1 pg.
English Abstract for Japanese Publication No. 2007-181725 A, published Jul. 19, 2007, 1 pg.
English Abstract for Japanese Publication No. 2009-118791 A, published Jun. 4, 2009, 1 pg.
PCT International Search Report dated Jul. 12, 2016 for Intl. App. No. PCT/JP2016/065086, from which the instant application is based, 2 pgs.
English Abstract and Machine Translation for Japanese Publication No. 2014-168400 A, published Sep. 18, 2014, 11 pgs.
English Abstract and Machine Translation for Japanese Publication No. 2009-118791 A, published Jun. 4, 2009, 11 pgs.
English Abstract and Machine Translation for Japanese Publication No. 2006-000102 A, published Jan. 5, 2006, 7 pgs.
English Abstract and Machine Translation for Japanese Publication No. 2006-180793 A, published Jul. 13, 2006, 9 pgs.
English Abstract and Machine Translation for Japanese Publication No. 2007-181725 A, published Jul. 19, 2007, 13 pgs.
Extended European Search Report for European Patent Application No. 16901727.4, dated Mar. 27, 2019, 8 pgs.
Li et al., "Spinning-Attire Commodity Science," 2nd edition, Donghua University Press, Apr. 2014, pp. 75-78, with partial English translation.

* cited by examiner

PET BED

RELATED APPLICATIONS

This application is a 35 U.S.C. 371 national stage filing from international application No. PCT/JP2016/065086, filed May 20, 2016, which claims priority to Japanese Application No. 2016-097178, filed May 13, 2016, the teachings of which are incorporated herein by reference.

FIELD

The present invention relates to a pet bed to be used when keeping or nursing a pet such as a dog.

BACKGROUND

It is difficult for a pet such as a dog, or a cat, etc., in a bedridden condition to turn over by itself on a mat of a pet bed, and the same portion of the body of the pet is often continued to be pressured against the mat by its body pressure, whereby it is easier for the skin, etc., of the pet at the portion which is in contact with the mat to be steamed and to be susceptible to physical stimulation, and as a result, it is easier for bedsores (decubitus) to occur. Accordingly, for example, in Patent Document 1, a mat for a pet which secures air permeability is suggested.

The mat for a pet which is disclosed in Patent Document 1 includes a space portion in which a substantially dented space is provided that is opened at the upper surface and has a predetermined depth in the bottom surface direction, and further includes a base portion which is formed by a material with a buffering action, and a covering portion which covers at least the opening of the space portion, wherein the covering portion includes an air permeable member with an air permeability. According to such a configuration, since the space portion and the air permeable member which covers the space portion are present in the upper surface of the mat for a pet, the mat can secure air permeability even when a pet is placed thereon.

PRIOR ART DOCUMENTS

Patent Documents

[Patent Document 1] Japanese Unexamined Patent Publication No. 2014-168400

DISCLOSURE OF THE INVENTION

Problems to be Solved by the Invention

Since a pet in a bedridden condition begins to preform excretion on a mat of a pet bed, an absorbent sheet is often disposed between the mat and the body of the pet. However, the back sheet of an absorbent sheet is normally configured by a sheet with waterproof property and air impermeability, and when such an absorbent sheet is disposed between the body of a pet, there may be cases in which even an air permeability is secured in the mat, the air permeability of the mat and even the entire pet bed is hindered by the absorbent sheet. Further, when a pet in a bedridden condition lies on an absorbent sheet which is placed on the pet bed, it is easier for the skin, etc., of the pet at the portion which is in contact with the absorbent sheet to be steamed and to be susceptible to physical stimulation, and there may be cases in which bedsores (decubitus) occur.

Accordingly, the object of the present invention is to provide a pet bed which, at the time when the pet bed is used and even when liquid such as excrement, etc., is excreted on the excretion surface of the bed, can suppress the steaming on the excretion surface of the bed and bedsores (decubitus) caused therefrom.

Means for Solving the Problems

In order to solve the above described problems, the pet bed according to the present invention includes a plane direction and a thickness direction, and comprises a mat which includes an upper surface and a lower surface; and an absorbent sheet which is disposed on the upper surface so as to overlap with the mat in the thickness direction wherein
the mat is a fiber structure which is configured by a thermoplastic resin fiber, and
the absorbent sheet includes a liquid permeable top sheet, an absorbent body, and a liquid impermeable and moisture permeable back sheet.

Effects of the Invention

According to the present invention, a pet bed which, at the time when the pet bed is used and even when liquid such as excrement, etc., is excreted on the excretion surface of the bed, can suppress the steaming on the excretion surface of the bed and bedsores (decubitus) caused therefrom can be provided.

MODE FOR CARRYING OUT THE INVENTION

[Aspect 1]

A pet bed which includes a plane direction and a thickness direction, and comprises a mat which includes an upper surface and a lower surface; and an absorbent sheet which is disposed on the upper surface so as to overlap with the mat in the thickness direction, wherein
the mat is a fiber structure which is configured by a thermoplastic resin fiber, and
the absorbent sheet includes a liquid permeable top sheet, an absorbent body, and a liquid impermeable and moisture permeable back sheet.

According to aspect 1, since the absorbent sheet which has moisture permeability and the mat formed by the fiber structure configured by the thermoplastic resin fiber in the pet bed are disposed so as to overlap with each other in the thickness direction, at the time when the bed is used and even when liquid such as excrement, etc., is excreted on the excretion surface of the bed, the moisture which is discharged through the back sheet of the absorbent sheet is diffused in the thickness direction and the plane direction of the mat, and the air permeability in the thickness direction and the plane direction of the bed can be secured, whereby it is easier to suppress the steaming on the excretion surface of the bed and bedsores (decubitus) caused therefrom.

[Aspect 2]

The pet bed according to aspect 1, wherein the mat includes a plurality of joining points in which the thermoplastic resin fiber which is a continuous fiber is mutually joined to each other, and does not include an end portion of the continuous fiber, in the upper surface.

According to aspect 2, since the mat is configured by the continuous fiber, and includes the plurality of joining points in which the continuous fiber is mutually joined to each other, even when the pet is placed on the excretion surface and the mat is compressed in the thickness direction, the compressed force is distributed in the plane direction of the mat so as to maintain the shape of the mat, and it is easier to secure the ventilation path, and further, since the mat does not include the end portion of the continuous fiber in the upper surface, it is easier to further reduce the stimulation the skin, etc., to be received by the pet through the absorbent sheet and to prevent bedsores (decubitus).

[Aspect 3]

The pet bed according to aspect 1 or 2, wherein the mat includes a thickness of 5 mm or more, a void ratio of 90% or more, and when a pressure of 3.4 kPa is received, a compression ratio of 20% or more.

According to aspect 3, since the mat includes the predetermined compression characteristics, even when the pet is placed on the excretion surface, it is easier to maintain the shape in the thickness direction of the mat, and to secure the ventilation path.

[Aspect 4]

The pet bed according to any one of aspects 1 to 3, wherein the thermoplastic resin fiber has a fiber diameter of 0.01 mm to 3 mm.

According to aspect 4, since the fiber diameter of the thermoplastic resin fiber which configures the mat is within the predetermined range, it is easier to maintain the strength of the mat, and even when the pet is placed on the excretion surface, it is easier to maintain the shape of the mat, and to secure the ventilation path.

[Aspect 5]

The pet bed according to any one of aspects 1 to 4, wherein the mat includes, in the thickness direction, a low density layer in which a density is relatively low, and a high density layer in which a density is relatively high.

According to aspect 5, when the mat is configured by a laminated body of two layers of the fiber structure layers having different densities, since a layer with a soft cushioning property which fits the pet, and a layer with a stiffer cushioning property in which it is easier to maintain the shape of the mat so as to secure the air permeability can be combined, the mat as a whole can have the characteristics of both the softness and the air permeability.

[Aspect 6]

The pet bed according to aspect 5, wherein the mat includes an upper layer which includes the upper surface and a lower layer which includes the lower surface, and the upper layer is the low density layer, and the lower layer is the high density layer.

According to aspect 6, by making the density of the upper layer which is relatively closer to the excretion surface on which the pet is placed lower than the density of the lower layer which is relatively farther from the excretion surface, the void ratio of the upper layer is to be higher than the void ratio of the lower layer, whereby while letting the upper layer have the air permeability and the softness, the strength of the lower layer can be made relatively higher so as to maintain the shape of the mat, to secure the ventilation path more stably, and to improve the sense of use of the bed as a whole which includes the mat.

[Aspect 7]

The pet bed according to aspect 6, wherein the thermoplastic resin fiber which is included in the lower layer is a hollow fiber.

According to aspect 7, since the thermoplastic resin fiber which configures the lower layer of the mat is a hollow fiber, in comparison to the case in which a solid fiber is used, the strength of the mat can be maintained more efficiently even with small amount of materials, and even when the pet is placed on the excretion surface, it is easier to maintain the shape of the mat and to secure the ventilation path.

[Aspect 8]

The pet bed according to aspect 6 or 7, wherein the mat further includes, in the thickness direction, a middle layer between the upper layer and the lower layer, and the density of the upper layer is higher than a density of the middle layer.

According to aspect 8, since the upper layer has a relatively higher density than the middle layer, even when the pet is placed on the excretion surface and the mat is compressed in the thickness direction, the compressed force is distributed in the plane direction of the mat so as to maintain the shape of the mat, and it is easier to secure the ventilation path, and further, since the middle layer has a relatively lower density than the upper layer and the void ratio is high, it is easier to maintain the air permeability and the softness.

[Aspect 9]

The pet bed according to any one of aspects 1 to 8, further comprising a frame body into which the mat is detachably fitted, wherein the frame body includes a bottom portion under the lower surface of the mat, and the bottom portion is configured by a material which has an air permeability, and a thickness of the frame body is thicker than a thickness of the mat.

According to aspect 9, since the frame body which is thicker than the mat is present so that the mat is detachably fitted thereinto, it is easier to perform the positioning of the absorbent sheet to be disposed on the upper surface of the mat, and the moisture which is discharged through the back sheet of the absorbent sheet is let to be transferred to the mat more stably, and further, since the bottom portion has the air permeability, it is difficult for the transfer of the moisture in the thickness direction of the bed to be hindered.

[Aspect 10]

The pet bed according to any one of aspects 1 to 9, further comprising a cushion material above the top sheet of the absorbent sheet, wherein the cushion material is a fiber structure which is configured by a thermoplastic fiber.

According to aspect 10, by the cushion material which is disposed on the top sheet of the absorbent sheet, the softness of the bed in the excretion surface is increased, and further, since the cushion material is present between the excretion surface of the bed and the absorbent sheet, even after excretion, it is difficult for the pet to feel the moisture of the absorbent sheet, whereby improves the sense of use of the bed, and still further, since the cushion material is the fiber structure which is configured by a thermoplastic fiber and has the air permeability, the moisture can be diffused in the thickness direction and the plane direction of the bed and the air permeability of the bed as a whole can be improved.

Hereinbelow, the preferable embodiments of the pet bed according to the present invention are explained in detail with reference to the drawings. Incidentally, in the present description, unless otherwise particularly noted, "viewing an object which is placed on a horizontal plane (for example, the pet bed, etc.), from an upper side in the vertical direction, in the thickness direction" may be referred to simply as "in a plan view", and a drawing in a plan view may be referred to as "a plan view".

The various directions, etc., which are used in the present description are, unless otherwise particularly noted, as follows.

In the present description, "the plane direction P" refers to "the direction in which a surface which is configured by an object extends in a plan view", and "the thickness direction T" refers to "the vertical direction with respect to an object which is placed on a horizontal plane", and the plane direction P and the thickness direction T are in a relationship of being mutually orthogonal to each other.

Further, in the present description, unless otherwise particularly noted, "the relatively farther side with respect to the placement surface of the pet bed at the time of using the pet bed" in the thickness direction of the pet bed is referred to as "the upper surface side", and "the relatively closer side with respect to the placement surface of the pet bed at the time of using the pet bed" is referred to as "the lower surface".

First Embodiment

Figure 1:
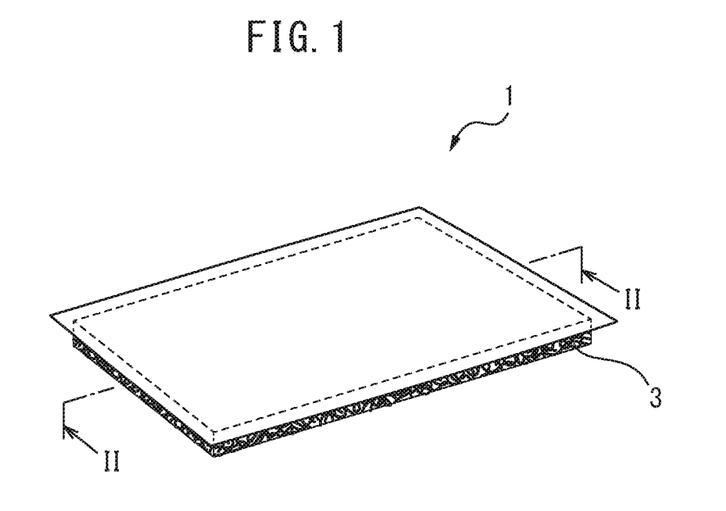
FIG. 1 is a perspective view of a pet bed according to a first embodiment of the present invention.

FIG. 1 is a perspective view of a pet bed according to a first embodiment of the present invention. Further, FIG. 2 is an end surface view along the II-II line of FIG. 1.

Figure 2:
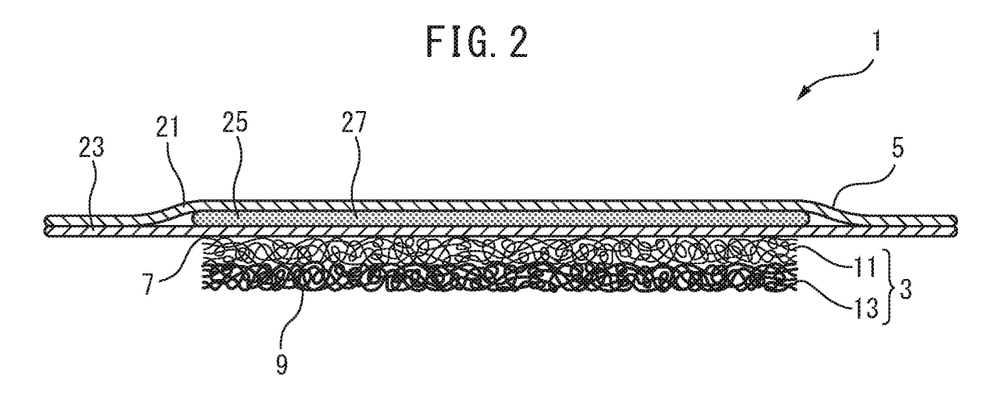
FIG. 2 is an end surface view along the II-II line of FIG. 1.

As shown in FIG. 1 and FIG. 2, the pet bed 1 includes the plane direction P and the thickness direction T, and further includes the mat 3 which includes the upper surface 7 and the lower surface 9, and the absorbent sheet 5 which is disposed on the upper surface 7 so as to overlap with the mat 3 in the thickness direction T.

Incidentally, in the present embodiment, "the longitudinal direction L" refers to "the direction in the longer direction of lengths of a long object in a plan view", and "the width direction W" refers to "the direction in the shorter direction (the transverse direction) of lengths of a long object in a plan view".

[The Mat]

In the present embodiment, the mat 3 is a fiber structure which is configured by a thermoplastic resin fiber and has a cushioning property, and in a plan view, has a substantially rectangular parallelepiped outer shape that includes the longitudinal direction L and the width direction W. Incidentally, in the present invention, the outer shape of the mat in a plan view is not limited to the shape of this embodiment, and an arbitrary shape (for example, a circle, an ellipse, a square, a triangle, a star, etc.) can be adopted according to the size of the pet to be the object, or the desired design, etc. Further, the size of the mat can be suitably set according to the size, the type, etc., of the pet which is to use the mat, and for example, in a case in which the pet is a small sized or a middle sized dog, the length in the longitudinal direction L is approximately 400 mm to 1400 mm, and the length in the width direction W is approximately 250 mm to 1200 mm. Further, the mat has a thickness (that is, the length in the thickness direction T) of preferably 5 mm to 60 mm, more preferably 20 mm to 50 mm, and even more preferably 35 mm to 45 mm, from the viewpoint of securing the cushioning property.

The pet which is to be the object of the pet bed to which the mat of the present invention is applied is not particularly limited, as long as the pet is an animal which may be kept as a pet, and the mat can be used for various animals such as mammals such as dogs, cats, rabbits, etc., reptiles such as snakes, etc., and amphibian, etc. Among these, the mat of the present invention is especially preferably used for an animal which is bedridden, for which it is difficult to turn over by itself, and needs nursing.

In the present invention, the mat preferably has a thickness of at least 5 mm or more as described above, and further, the mat preferably has a void ratio of 90% or more, and a compression characteristics in which the compression ratio is 20% or more when a pressure of 3.4 kPa is received. The mat 3 has a predetermined compression characteristics when a pressure of approximately 3.4 kPa is received, which is the body pressure to be received when a pet such as a small sized dog, etc., lies on the mat 3, whereby even when the pet is placed on the excretion surface, it is easier to maintain the shape in the thickness direction T of the mat 3, and to secure the ventilation path.

Incidentally, in the present description, the measurement of the thickness of the mat is performed by placing the measurement target (such as the mat, the later described frame body, cushion material, etc.) on a horizontal plane, measuring the height at arbitrary four portions (the height being the distance between the horizontal plane to the upper surface of the measurement target), and adopting the average value thereof.

Further, the void ratio of the mat can be obtained by cutting out a sample of the size of 15 cm×15 cm with the thickness as it is from the mat which is the measurement target, immersing the sample in a suitable liquid whereby measuring the volume occupied by the fiber of the fiber structure (the fiber volume), and dividing the fiber volume by the apparent volume of the fiber structure. Note that the apparent volume of the fiber structure can be obtained by calculating the outer dimensions of the fiber structure (which is 15 cm×15 cm×thickness, in the above described sample).

Further, the measurement of the thickness of the mat when pressured by the pressure of 3.4 kPa (35 gf/cm$^2$) can be performed as follows. First, a pressure plate with a predetermined area (for example, a circular pressure plate with an area of 100πcm$^2$) is pressed against the fiber structure which is the measurement target with a pressure of 3.4 kPa. Then, by measuring the thickness (mm) of the fiber structure in a state of being pressed by the pressure plate, the thickness when pressured by the predetermined pressure can be obtained.

Still further, the compression ratio of the mat when the pressure of 3.4 kPa is received can be obtained by expressing the value calculated by dividing the thickness when pressured by the pressure of 3.4 kPa by the thickness of the mat before receiving the pressure, in a percentage. For example, in a case in which the thickness when pressured by the pressure of 3.4 kPa is 8.0 mm, and the thickness of the mat before receiving the pressure is 40 mm, the compression ratio of the mat when the pressure of 3.4 kPa is received is 20%.

In the present invention, from the viewpoint of maintaining the shape in the thickness direction of the mat, and securing the ventilation path, the compression ratio of the mat is preferably 20% or more, more preferably 40% or more, and even more preferably 60% or more.

The fiber structure which configures the mat according to the present invention has the ventilation degree in the thickness direction and in the plane direction which is measured based on JIS L 1096:8.27.1 A method (Frazier form method, 2010 edition) of preferably 100 $cm^3/cm^2/sec$ or more, more preferably 200 $cm^3/cm^2/sec$ or more, and even more preferably 250 $cm^3/cm^2/sec$ or more. By adjusting the ventilation degree of the mat to the above described range, the moisture derived from liquid such as excrement, etc., excreted from the pet diffuses in the thickness direction and in the plane direction of the mat, and the air permeability of the pet bed can be secured in the thickness direction and in the plane direction, whereby at the time when the bed is used, even when liquid such as excrement, etc., is excreted on the excretion surface of the bed, it is easier to suppress the steaming on the excretion surface of the bed and bedsores (decubitus) caused therefrom.

In the present embodiment, the mat 3 includes the upper layer 11 which includes the upper surface 7, and the lower layer 13 which includes the lower surface 9, and the both layers are overlapped with each other in the thickness direction T.

In the present invention, the materials which configure the upper layer and the lower layer of the mat are reticular fiber structures formed respectively by the first and the second thermoplastic resin fibers, and by having a predetermined thickness and void ratio, the upper layer and the lower layer have excellent cushioning property of high resilience, and excellent properties in air permeability, water permeability, and durability, etc. Incidentally, such a reticular fiber structure is a structure in which fibrous material of thermoplastic resin which is a continuous fiber forms a large number of loops, while being intertwined in disorder, and is joined to each other so as to have a plurality of joining points by thermal fusion. Further, preferably, the end portion of the continuous fiber is not included in at least the upper surface of the mat. Incidentally, in the present invention, since the end portion of the continuous fiber in the fiber structure which configures the mat may be present in the side surface which extends in the thickness direction of the fiber structure, the end portion of the continuous fiber may be included in the boundary portion of each surfaces which can be understood as either the upper surface or the side surface of the fiber structure. Accordingly, the end portion of the continuous fiber not being included in at least the upper surface of the mat means that the end portion of the continuous fiber is substantially not included in the upper surface of the fiber structure which configures the mat, and the end portion of the continuous fiber may be included in the above described boundary portion (that is, the boundary portion of the upper surface and the side surface of the fiber structure which configures the mat). According to such a configuration, since the mat is configured by the continuous fiber, and includes the plurality of joining points in which the continuous fiber is mutually joined to each other, even when the pet is placed on the excretion surface and the mat is compressed in the thickness direction, the compressed force is distributed in the plane direction of the mat so as to maintain the shape of the mat, and it is easier to secure the ventilation path, and further, since the mat does not include the end portion of the continuous fiber in the upper surface, it is easier to further reduce the stimulation the skin, etc., to be received by the pet through the absorbent sheet and to prevent bedsores (decubitus).

Further, as the thermoplastic resin which forms the reticular fiber structure, for example, polyester resin, polyamide resin, polyether resin, polyolefin resin, etc., may be used.

In the present invention, the first thermoplastic resin fiber which configures the upper layer is a solid fiber which has a fiber diameter of preferably 0.01 mm to 3 mm, and more preferably 0.1 mm to 1 mm. Further, the second thermoplastic resin fiber which configures the lower layer is a hollow fiber which has a fiber diameter of preferably 0.01 mm to 3 mm, and more preferably 0.5 mm to 3 mm.

Since the fiber diameter of the thermoplastic resin fibers 15, 17 which configure the upper layer 11 the lower layer 13 is within the range of 0.01 mm to 3 mm, it is easier to maintain the strength of the mat, and even when the pet is placed on the excretion surface, it is easier to maintain the shape of the mat, and to secure the ventilation path. Further, in the present embodiment, since the thermoplastic resin fiber which configures a portion (that is, the lower layer 13) of the mat 3 is a hollow fiber, in comparison to the case in which a solid fiber is used, the strength of the mat can be maintained more efficiently even with small amount of materials, and even when the pet is placed on the excretion surface, it is easier to maintain the shape of the mat and to secure the ventilation path.

The measurement of the fiber diameter of a fiber which configures the fiber structure can be performed as follows. First, a fiber with a predetermined length (for example, 5 mm) is cut out from arbitrary ten portions in the fiber structure of the measurement target, and the end portion of the cut out fiber is cut at right angles with respect to the direction in which the fiber extends. The cut surface is photographed at a predetermined enlargement magnification, and the fiber diameter of the fiber (mm) is measured from the obtained cross sectional photograph. Incidentally, the average value of the fiber diameters of the cut out 10 fibers is adopted as the fiber diameter.

In the present invention, the density (the apparent density) of the upper layer is preferably 0.01 to 0.2 $g/cm^3$, and more preferably 0.01 to 0.1 $g/cm^3$, and the density (the apparent density) of the lower layer is preferably 0.01 to 0.2 $g/cm^3$, and more preferably 0.02 to 0.15 $g/cm^3$.

Incidentally, in the present description, unless otherwise particularly noted, the measurement of the density (the apparent density) of a target (for example, the upper layer, the lower layer) can be performed as follows. First, a sample of the size of 15 cm×15 cm with the thickness as it is, is cut out from the measurement target, and the mass (g) of the sample is measured. Next, the thickness (cm) of the cut out sample is measured, and the volume ($cm^3$) of the sample is calculated. Finally, by dividing the mass of the sample by the volume, the value of the density (the apparent density) ($g/cm^3$) can be obtained.

In the present invention, the density of the upper layer is lower than the density of the lower layer, and the density difference is preferably 0.01 to 0.1 $g/cm^3$, and more preferably 0.03 to 0.08 $g/cm^3$. By making the density of the upper layer which is relatively closer to the excretion surface on which the pet is placed lower than the density of the lower layer which is relatively farther from the excretion surface, and the void ratio be higher, while letting the upper layer side have the air permeability and the softness, the strength of the lower layer can be made relatively higher so as to maintain the shape of the mat, to secure the ventilation path more stably, and to improve the sense of use of the pet bed as a whole which includes the mat.

In another embodiment of the present invention, in between the upper layer the lower layer, a middle layer may be present in which the first and the second thermoplastic resin fibers are mixed, or only the first and the second thermoplastic resin fiber are present. In such a case, the middle layer is formed by the first and the second thermoplastic resin fibers being joined by thermal fusion, and the density (the apparent density) in the middle layer is preferably 0.01 g/cm$^3$ to 0.1 g/cm$^3$, and more preferably 0.01 g/cm$^3$ to 0.05 g/cm$^3$.

Further, the density of the upper layer is preferably higher than the density of the middle layer. According to such a configuration, since the upper layer has a relatively higher density than the middle layer, even when the pet is placed on the excretion surface and the mat is compressed in the thickness direction T, the compressed force is distributed in the plane direction of the mat so as to maintain the shape of the mat, and it is easier to secure the ventilation path, and further, since the middle layer has a relatively lower density than the upper layer and the void ratio is high, it is easier to maintain the air permeability and the softness.

Incidentally, the first and the second thermoplastic resin fibers are formed by being joined by thermal fusion, however, in another embodiment of the present invention, the formation of the fibers is not limited to this, and for example, a portion of the first and the second thermoplastic resin fibers may be joined by an adhesive means such as a hot melt adhesive agent, etc.

The manufacturing method of the fiber structure which configures the mat is not particularly limited, and the fiber structure may be manufactured by a known and arbitrary manufacturing method. The fiber structure may be manufactured, for example, by discharging a thermoplastic resin in a molten state into a filament from a multi-hole discharge nozzle with a plurality of orifices, making the discharged filament come into contact with each other still in a molten state, whereby obtaining a reticular fiber structure which is formed by a fibrous material forming a large number of loops, while being intertwined in disorder and mutually fused, and thereafter cooling the reticular fiber structure while sandwiching the both surfaces of the reticular fiber structure by a pair of endless net conveyors.

The various properties such as the thickness, the density, the compression characteristics of the fiber structure, the fiber diameter of the configurational fibers, etc., can be easily adjusted by suitably setting the various manufacturing conditions, such as the discharging port diameter, the discharging amount (pressure) of the above described multi-hole discharge nozzle, the distance between the conveyors of the pair of endless net conveyors, the conveying speed, and the cooling temperature, etc.

Incidentally, the fiber structure which is to be used in the later described cushion material can also be manufactured in the same manner.

[The Absorbent Sheet]

In the present embodiment, the absorbent sheet 5 is a flat sheet which has a predetermined sheet thickness. As shown in FIG. 2, the absorbent sheet 5 is mainly configured by the top sheet 21, the back sheet 23, and the absorbent body 25. The absorbent body 25 is held in between the top sheet 21 and the back sheet 23. The absorbent sheet 5 is preferably configured as a substantially rectangular shape, however, in the same manner as the mat 3, an arbitrary shape (for example, a circle, an ellipse, a square, a triangle, a star, etc.) can be adopted according to the size of the pet to be the object, or the desired design, etc.

In the present embodiment, the top sheet 21 and the back sheet 23 are rectangular sheets with approximately the same dimensions, and are configured so as to make a figure almost similar to the outer shape of the absorbent sheet 5. As shown in FIG. 2, the top sheet 21 is configured as a liquid permeable sheet which lets liquid, such as an excrement, etc., permeate therethrough, so as to be the excretion surface which receives the excrement excreted by a pet. Further, the back sheet 23 is disposed so as to face the top sheet 21 in the thickness direction T. The back sheet 23 has a liquid impermeability so as to prevent or suppress the permeability of liquid, such as an excrement, etc., however, is configured so as to have a moisture permeability or an air permeability which transfers the moisture derived from the liquid, such as an excrement, etc. downward in the thickness direction.

In the present invention, the top sheet is preferably configured by a thermoplastic nonwoven fabric.

In the present embodiment, the back sheet 23 is provided so as to prevent the liquid, such as an excrement, etc. which is excreted from the pet from leaking out from the absorbent sheet 5, and is configured by a liquid impermeable and moisture permeable sheet. Such a liquid impermeable sheet has a moisture permeability of preferably 1,500 to 4,500 g/m$^2$/24 h. more preferably 2,000 to 4,000 g/m$^2$/24 h, and even more preferably 2,500 to 3,800 g/m$^2$/24 h. Such a configuration helps the moisture inside the absorbent sheet be discharged through the liquid impermeable sheet, and the air permeability in the thickness direction and the plane direction of the bed be secured.

The above described moisture permeability adopts the value which is measured according to "Moisture permeability test method of a moisture-proof packaging material (The cup method)" of JIS Z 0208:1976, however, the test is performed in the different manner from JIS Z 0208:1976 in the following points.

(i) 20 g of water is filled into the moisture permeable cup instead of calcium chloride.

(ii) The moisture permeability is measured in a constant temperature and humidity chamber having a temperature of 40° C. and a relative humidity of 60%.

(iii) After being left still for 24 hours, not the mass increase of the cup but the mass decrease (the discharged amount) of 20 g of water is measured.

As the liquid impermeable sheet, a film such as a polyolefin type film, a nonwoven fabric such as a spunbond or a spunlace nonwoven fabric, etc., may be mentioned. In a case in which the liquid impermeable sheet is a film, the film preferably has a moisture permeability, and for example, is preferably a moisture permeable film. Further, the liquid impermeable sheet preferably does not have a liquid permeability. Still further, in a case in which the liquid impermeable sheet is a film, an example of a polyethylene film which includes fine particles such as barium sulfate and calcium carbonate, etc., with a thickness of 0.01 to 0.03 mm may be mentioned.

Incidentally, the measurement of the thickness of the sheet which configures the absorbent sheet can be performed as follows. First, a sample sheet with a predetermined size (for example, 100 mm×100 mm) is cut out from the sheet of the measurement target. Then, the cut out sample sheet is set to an automated compression tester "KES FB-3A" manufactured by Kato Tech Co., Ltd., and the thickness (mm) when the pressure to the sample sheet by the measurement terminal of the tester is 49 Pa is measured, whereby the measured thickness (mm) is regarded as the thickness of the sample sheet.

In the present embodiment, the absorbent body 25 absorbs and retains the liquid such as the excrement, etc., which is excreted from a pet. The configuration of the absorbent body is not particularly limited, and a known absorbent body may be used. The absorbent body 25 according to the present embodiment is configured by a colored tissue which is disposed on the top sheet 21 side and is colored, a lower layer tissue which is disposed on the back sheet 23 side, and a pulverized pulp layer which is disposed between the colored tissue and the lower layer tissue and in which the first super absorbent polymers (SAP) are evenly mixed, and the second super absorbent polymers (SAP) are sprinkled on the pulverized pulp layer (which is not shown).

Since the pet bed 1 according to the present embodiment which has the above described configuration is configured so that the absorbent sheet which has moisture permeability and the mat formed by the fiber structure configured by the thermoplastic resin fiber are disposed so as to overlap with each other in the thickness direction, at the time when the bed is used and even when liquid such as excrement, etc., is excreted on the excretion surface of the bed, the moisture which is discharged through the back sheet of the absorbent sheet is diffused in the thickness direction and the plane direction of the mat, and the air permeability in the thickness direction and the plane direction of the bed can be secured, whereby it is easier to suppress the steaming on the excretion surface of the bed and bedsores (decubitus) caused therefrom.

Second Embodiment

Figure 3:
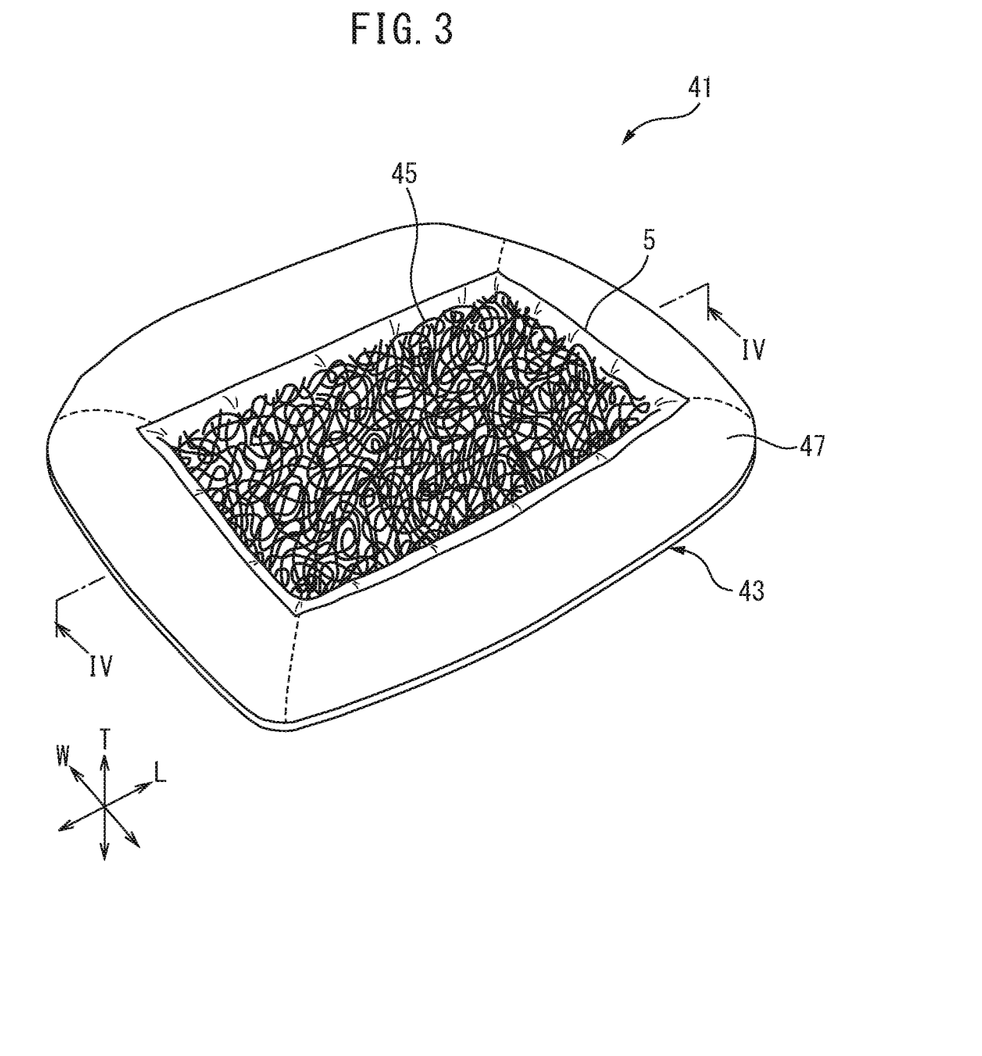
FIG. 3 is a perspective view of a pet bed according to a second embodiment of the present invention.
Figure 4:
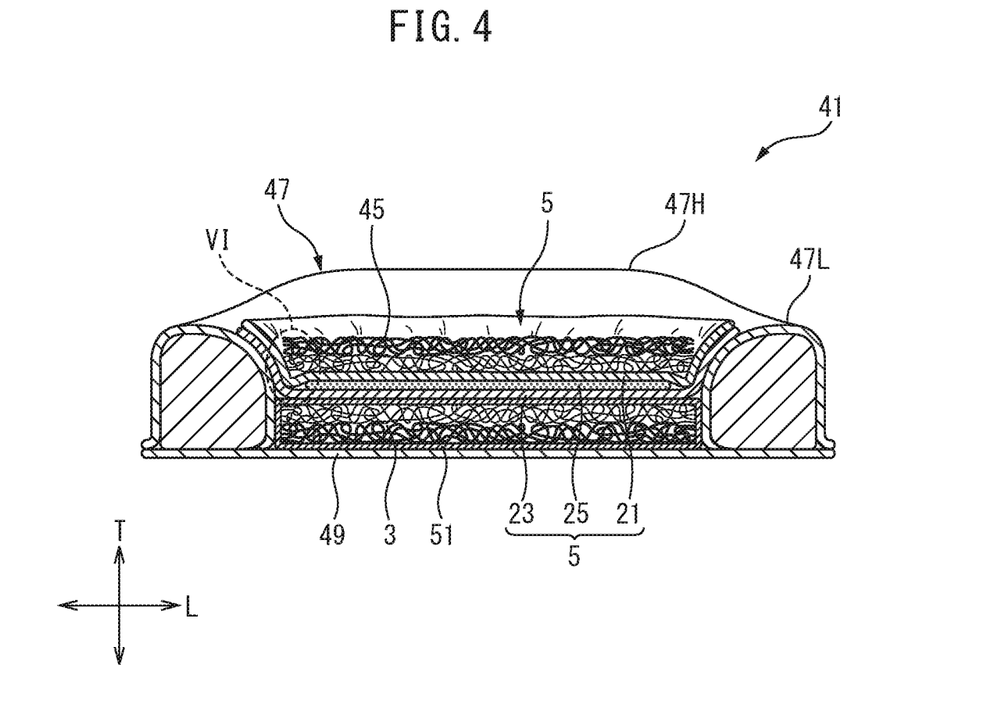
FIG. 4 is an end surface view along the IV-IV line of FIG. 3.
Figure 5:
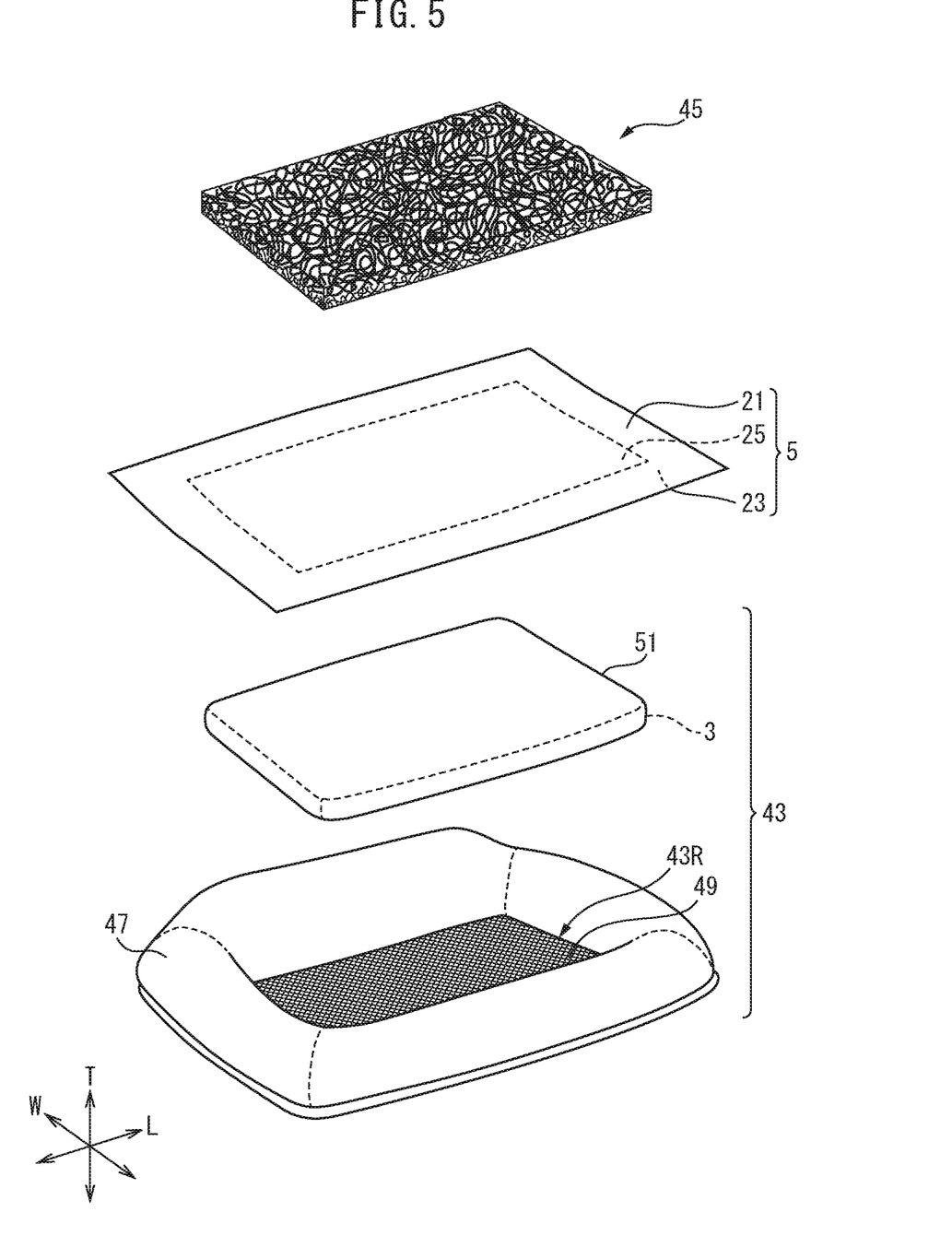
FIG. 5 is an exploded perspective view of the pet bed according to a second embodiment of the present invention.

FIG. 3 is a perspective view of a pet bed 41 according to a second embodiment of the present invention. FIG. 4 is an end surface view along the IV-IV line of FIG. 3. FIG. 5 is an exploded perspective view of the pet bed according to the second embodiment of the present invention. Incidentally, in the pet bed 41 according to the second embodiment of the present invention, those having the configuration similar to the first embodiment are allotted with the same reference number and the detailed explanation thereof is omitted.

In the present embodiment, as shown in FIG. 3 to FIG. 5, the pet bed 41 is configured by including the bed main body 43, the absorbent sheet 5, and the cushion material 45.
[The Bed Main Body]

In the present embodiment, the bed main body 43 is configured by including the mat 3 which has a cushioning property and a substantially rectangular parallelepiped shape, and a frame body 47 into which the mat is detachably fitted.

The frame body 47, in a plan view, has a frame like shape along each sides of a substantially rectangular parallelepiped shape having the longitudinal direction L, the width direction W, and the thickness direction T, and further includes the bottom portion 49 under the lower surface of the mat 3. In the frame body 47, one side among the four sides of the frame like structure along each sides of the substantially rectangular parallelepiped shape is formed as the frame body higher portion 47H in which the thickness is relatively thicker than the other sides, and when the mat 3 is fitted into the inner side of the frame body 47 in a plan view so as to form the bed main body 43, the frame body higher portion 47H may function as a backrest, etc., of the pet. On the other hand, the three sides among the four sides of the frame body 47 are formed as the frame body lower portions 47L in which the thickness is relatively thinner than the above described frame body higher portion 47H, and when the mat 3 is fitted into the frame body 47 so as to form the bed main body 43, the frame body lower portions 47L may function as a pillow in which a pet can place the head portion thereof.

Incidentally, the pet bed according to the present invention is not limited to such a configuration, and for example, the pet bed may be formed so that two sides among the four sides of the frame body are made to be thicker, or all of the four sides are made to have the same thickness. Further, in a case in which the shape of the frame body in a plan view is circle, etc., the frame body may be formed so that a part of the peripheral portion of the circle is made to be thicker.

Incidentally, in a case in which the frame body does not have a constant thickness as in the above described embodiment, the thickness of the frame body 47 is referred to as the thickness of the portion with the smallest thickness (in the case of the above described embodiment, the thickness of the frame body lower portion 47L). Further, the measurement of the thickness of the frame body is performed in the same manner as the above described measurement method of the thickness of the mat.

In the present embodiment, the thickness of the frame body lower portion 47L is thicker than the thickness of the mat 3, and the thickness difference between the frame body bottom portion and the mat is preferably 5 mm or more, and more preferably 10 mm or more.

The members and materials which configure the frame body 47 are not particularly limited, and for example, those known in this technical field can be adopted, such as those in which a cushion material such as urethane foam, foamed beads, etc., is covered by fabric. Further, the frame body 47 may be configured in one piece which has the above described frame like structure, or may be configured by a plurality of structures (for example, four pieces of substantially linear structures) being combined with each other. Note that in order to secure the air permeability of the frame body, the ventilation degree in the thickness direction and in the plane direction which is measured based on JIS L 1096:8.27.1 A method (Frazier form method, 2010 edition) is preferably 50 $cm^3/cm^2/sec$ or more, more preferably 80 $cm^3/cm^2/sec$ or more, and even more preferably 100 $cm^3/cm^2/sec$.

In the present embodiment, the bottom portion 49 is formed, in a plan view, by a mesh like fabric (for example, a woven fabric or a knitted fabric configured by synthetic fibers, etc.) which is continued from the inner side of the frame body 47 and the lower surface side of the frame body 47. The air permeability is secured in the bottom portion 49 so that moisture, etc., would not get caught in the mat 3 which is fitted into the inside of the frame body 47, and the ventilation degree which is measured based on JIS L 1096: 8.27.1 A method (Frazier form method, 2010 edition) is preferably 100 $cm^3/cm^2/sec$ or more, more preferably 200 $cm^3/cm^2/sec$ or more, and even more preferably 250 $cm^3/cm^2/sec$ or more.

In the present embodiment, as shown in FIG. 5, the mat 3 is configured by the substantially rectangular parallelepiped cushion material 45 which has the longitudinal direction L, the width direction W, and the thickness direction T, is disposed at the position which corresponds to the bottom surface of the recessed portion 43R that forms the bed of the bed main body, and is configured so as to support the body of the pet while distributing in the plane direction the body pressure of the pet which lies within the recessed portion 43R. The lengths in various directions of the mat 3 (that is, the size of the rectangular parallelepiped shape) are not particularly limited as long as such size can support the body of the pet which lies within the above described recessed portion 43R, and an arbitrary size can be adopted.

In the present embodiment, the entire surfaces of the mat 3 are covered by the mat cover 51. The materials which configure the mat cover are not particularly limited, and for example, various sheet like members such as a woven fabric, a knitted fabric, a nonwoven fabric, etc., may be adopted, however, from the viewpoint of softness, the air permeability, ease of handling (ease of washing), strength, etc., a fiber sheet made of a woven fabric, or a knitted fabric, etc., is preferably used. Further, in a case in which the sheet like member is made of such a fiber sheet, the configurational fibers are not particularly limited, and for example, arbitrary fibers may be used, such as synthetic fibers (for example, polyester fibers, nylon fibers, etc.), natural fibers (for example, cotton, silk, etc.), regenerated fibers (for example, rayon, cupra etc.), and semi synthetic fibers (acetate fibers, etc.). However, in order to make it difficult for the air permeability of the mat 3 to be hindered, the ventilation degree which is measured based on JIS L 1096:8.27.1 A method (Frazier form method, 2010 edition) is preferably 50 $cm^3/cm^2$/sec or more, more preferably 80 $cm^3/cm^2$/sec or more, and even more preferably 100 $cm^3/cm^2$/sec.

[The Absorbent Sheet]

As shown in FIG. 3 to FIG. 5, on the upper surface side of the bed main body 43, the absorbent sheet 5 is disposed so as to overlap with the bed main body 43 in the thickness direction T.

According to the above described configuration, since the frame body which is thicker than the mat is present so as to surround the mat, it is easier to perform the positioning of the absorbent sheet to be disposed on the upper surface side of the mat, and the moisture which is discharged through the back sheet of the absorbent sheet is let to be transferred to the mat more stably, and further, since the bottom portion has the air permeability, it is difficult for the transfer of the moisture in the thickness direction of the bed to be hindered.

[The Cushion Material]

As shown in FIG. 3 to FIG. 5, on the upper surface side of the absorbent sheet 5, the cushion material 45 is disposed so as to overlap with the absorbent sheet 5 in the thickness direction T.

In the present embodiment, as shown in FIG. 3 to FIG. 5, the cushion material 45 is configured by the substantially rectangular parallelepiped cushion material which has the longitudinal direction L, the width direction W, and the thickness direction T, is disposed at the position which corresponds to the bottom surface of the recessed portion 43R that forms the bed of the bed main body, and is configured so as to support the body of the pet while distributing in the plane direction the body pressure of the pet which lies within the recessed portion 43R. The lengths in various directions of the cushion material (that is, the size of the rectangular parallelepiped shape) are not particularly limited as long as such size can support the body of the pet which lies within the above described recessed portion 43R, and an arbitrary size can be adopted.

The material which configures the cushion material 45 is not particularly limited as long as the material can function as the cushion material, and for example, a reticular fiber structure made of urethane foam, or thermoplastic resin, etc., may be used. Among these, from the viewpoint of having an excellent cushioning property of high resilience, and excellent properties in air permeability, water permeability, and durability, etc., as the cushion material, a reticular fiber structure made of thermoplastic resin is preferably used. Incidentally, such a reticular fiber structure is a structure in which fibrous material of thermoplastic resin forms a large number of loops, while being intertwined in disorder, and is joined to each other by thermal fusion. As the thermoplastic resin which forms the reticular fiber structure, for example, polyester resin, polyamide resin, polyether resin, polyolefin resin, etc., may be used.

In the present embodiment, the fiber structure which configures the cushion material 45 is a fiber structure which has a thickness of at least 5 mm or more, and further, has a void ratio of 90% or more, and a compression characteristics and a structure in which the compression ratio is 20% or more when a pressure of 3.4 kPa is received.

Note that from the viewpoint of securing the air permeability in the thickness direction T and in the plane direction P of the pet bed 41, the ventilation degree in the thickness direction and in the plane direction of the cushion material which is measured based on JIS L 1096:8.27.1 A method (Frazier form method, 2010 edition) is preferably 100 $cm^3/cm^2$/sec or more, more preferably 200 $cm^3/cm^2$/sec or more, and even more preferably 250 $cm^3$/cm/sec or more.

By the cushion material which is disposed on the top sheet of the absorbent sheet, the softness of the bed in the excretion surface is increased, and further, since the cushion material is present between the excretion surface of the bed and the absorbent sheet, even after excretion, it is difficult for the pet to feel the moisture of the absorbent sheet, whereby improves the sense of use of the bed, and still further, since the cushion material is the fiber structure which is configured by a thermoplastic fiber and has the air permeability, the moisture is quickly transferred to the absorbent sheet, and it is difficult for the air permeability of the bed in the thickness direction and in the plane direction to be hindered.

Further, in the present invention, as the fiber structure which configures the above described cushion material, a fiber structure with a two layer structure which includes, in the thickness direction, a high density layer that forms the upper surface of the fiber structure and the density (the apparent density) is relatively high, and a low density layer that is positioned on the lower side of the high density layer and has a relatively lower density, may also be preferably used.

When the fiber structure which configures the cushion material includes, in the thickness direction, the high density layer which has a relatively higher density and the low density layer which has a relatively lower density, in the cushion material, since a layer with a soft cushioning property which fits the pet, and a layer with a stiffer cushioning property in which it is easier to maintain the shape of the cushion material so as to secure the air permeability can be combined, the cushion material as a whole can have the characteristics of both the softness and the air permeability.

Figure 6:
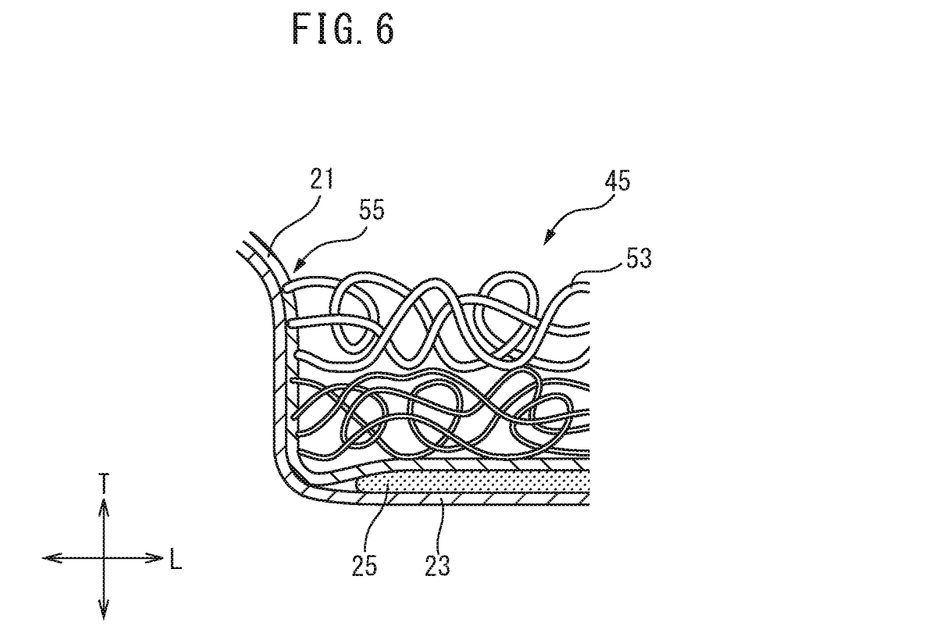
FIG. 6 is an enlarged view of VI portion of FIG. 4.

FIG. 6 is an enlarged view of VI portion of FIG. 4. As shown in FIG. 6, the cushion material 45 includes, in the side surface which extends in the thickness direction, the end portion 55 of the fiber 53 which configures the fiber structure, and this end portion 55 is engaged with the absorbent sheet 5. According to such a configuration, the peripheral portion of the absorbent sheet 5 is retained by the end portion 55 of the fiber 53 which is present in the side surface of the cushion material 45, so as to maintain the state in which the peripheral portion of the absorbent sheet 5 is standing up, whereby it is difficult for the cushion material 45 and the absorbent sheet 5 to be shifted, and further, since the cushion material 45 has the air permeability, the moisture can be diffused in the thickness direction and the plane direction of the bed and the air permeability of the bed as a whole can be improved, and thus even after excretion, it is difficult for the pet to feel the moisture of the absorbent sheet, whereby improves the sense of use of the bed.

Incidentally, in the present embodiment, the pet bed 41 is configured by including the bed main body 43, the absorbent sheet 5, and the cushion material 45, however, in another embodiment of the present invention, the pet bed may be configured by omitting the cushion material. Further, each of the configurational elements of the pet bed according to the present invention may be suitably modified as long as such elements can demonstrate the actions and effects thereof.

REFERENCES SIGNS LIST 1, 41 pet bed
3 mat
5 absorbent sheet
11 upper layer
13 lower layer
15 first thermoplastic resin fiber
17 second thermoplastic resin fiber
19 middle layer
21 top sheet
23 back sheet
25 absorbent body
43 bed main body
45 cushion material
47 frame body
49 bottom portion
51 mat cover
53 fiber
55 end portion

The invention claimed is:

1. A pet bed which includes a plane direction and a thickness direction, and comprises a mat which includes an upper surface and a lower surface; and an absorbent sheet which is disposed on the upper surface so as to overlap with the mat in the thickness direction, wherein
the mat is a fiber structure which is configured by a thermoplastic resin fiber, and
the absorbent sheet includes at least a three layer structure comprising:
a top sheet that is liquid permeable;
a middle absorbent body located below the top sheet; and
a back sheet located below the middle absorbent body, wherein the back sheet contacts the upper surface of the mat and the back sheet is both liquid impermeable and moisture permeable so that moisture is discharged through the back sheet and is diffused in the thickness direction and the plane direction of the pet bed to suppress steaming on the top sheet when a pet lies on the top sheet and excretes a liquid excrement on the top sheet.

2. The pet bed according to claim 1, wherein
the mat includes a plurality of joining points in which the thermoplastic resin fiber which is a continuous fiber is mutually joined to each other, and does not include an end portion of the continuous fiber, in the upper surface.

3. The pet bed according to claim 1, wherein
the mat includes a thickness of 5 mm or more, a void ratio of 90% or more, and when a pressure of 3.4 kPa is received, a compression ratio of 20% or more.

4. The pet bed according to claim 1,
wherein
the thermoplastic resin fiber has a fiber diameter of 0.01 mm to 3 mm.

5. The pet bed according to claim 1, wherein
the mat includes, in the thickness direction, a low density layer in which a density is relatively low, and a high density layer in which a density is relatively high.

6. The pet bed according to claim 5, wherein
the mat includes an upper layer which includes the upper surface and a lower layer which includes the lower surface, and
the upper layer is the low density layer, and the lower layer is the high density layer.

7. The pet bed according to claim 6, wherein
the thermoplastic resin fiber which is included in the lower layer is a hollow fiber.

8. The pet bed according to claim 6, wherein
the mat further includes, in the thickness direction, a middle layer between the upper layer and the lower layer, and
the density of the upper layer is higher than a density of the middle layer.

9. The pet bed according to claim 1, further comprising a frame body into which the mat is detachably fitted, wherein
the frame body includes a bottom portion under the lower surface of the mat, and
the bottom portion is configured by a material which has an air permeability, and a thickness of the frame body is thicker than a thickness of the mat.

10. The pet bed according to claim 1, further comprising a cushion material above the top sheet of the absorbent sheet, wherein
the cushion material is a fiber structure which is configured by a thermoplastic fiber.

\* \* \* \* \*